United States Patent [19]

Asano et al.

[11] Patent Number: 5,035,549

[45] Date of Patent: Jul. 30, 1991

[54] BORING APPARATUS

[75] Inventors: Osamu Asano; Michihiro Shoji; Masunari Kowada, all of Tokyo, Japan

[73] Assignee: Nitto Kohki Co., Ltd., Tokyo, Japan

[21] Appl. No.: 540,494

[22] Filed: Jun. 19, 1990

[30] Foreign Application Priority Data

Jun. 23, 1989 [JP] Japan .............................. 1-73941[U]

[51] Int. Cl.[5] ............................................ B23B 47/18

[52] U.S. Cl. .................................. 408/132; 408/135; 408/76; 408/56; 74/625; 74/640; 192/96; 192/71

[58] Field of Search .................... 408/132, 76, 5, 135, 408/136, 133, 139, 56; 192/96, 71; 74/625, 89.15, 640

[56] References Cited

U.S. PATENT DOCUMENTS

| | | | |
|---|---|---|---|
| 1,071,539 | 8/1913 | Weigel | 74/625 |
| 3,555,929 | 1/1971 | Hossfeld | 74/640 |
| 4,741,226 | 5/1988 | Bernard | 408/129 X |
| 4,789,274 | 12/1988 | Shoji et al. | 408/11 |

*Primary Examiner*—Larry I. Schwartz
*Assistant Examiner*—Robert Schultz
*Attorney, Agent, or Firm*—Kinney & Lange

[57] ABSTRACT

A boring apparatus wherein the size in the axial direction of the shaft of the manual handle horizontally supported can be made small-sized. A clutch is composed of spherical bodies, a cylindrical body having formed therein hole portions for receiving the spherical bodies, spherical body pressing means for pressing the spherical bodies to the outside or inside of the cylindrical body, and an engagement member having recessed portions engaging with the spherical bodies which are projected to the outside or inside of the cylindrical body, and the boring apparatus is constructed by using the clutch.

8 Claims, 8 Drawing Sheets

BORING APPARATUS

BACKGROUND OF THE INVENTION

1. Field of the Invention

The present invention relates to a boring apparatus or a magnetic base drill unit, and particularly to a light-weight and small sized boring apparatus.

2. Description of the Prior Art

Various kinds of boring apparatus as magnetic base drill units have already been proposed, which comprise a drill unit provided with an annular hole cutter, a magnetic base for causing the drill unit to be magnetically adhered onto a workpiece for fixing, a feed motor for automatically feeding the drill unit to the workpiece, and the like. A magnetic base drill unit has also been proposed, wherein the drill unit is restored to its initial position after the hole cutting work by the drill unit is completed.

For instance, in the specification of U. S. Pat. No. 4,789,274 issued on Dec. 6, 1988 and assigned to the same assignee as the present invention, a technique is described for enhancing the efficiency of the hole cutting work by making the restoring (rise) speed of the drill unit after the termination of the hole cutting work faster than the feed (fall) speed of the drill unit during the hole cutting work. Specifically, in the magnetic base drill unit described in the above U.S. Pat. No., rotation of the feed motor is transmitted to the drill unit through a reduction gear during the hole cutting work, while it is transmitted to the drill unit without through the reduction gear after the termination of the hole cutting work.

The feed mechanism of such boring apparatus is provided with a clutch in the power transmission device between the feed motor and the manual feed mechanism, so that the transmission of power from the feed motor to the feed mechanism can be released by letting out the clutch, thereby enabling the drill unit to be risen or fallen by using a manual handle.

In the U.S. Pat. No. described above, the drill unit is provided with a rack in the rise and fall direction thereof, and the gear of the final stage of a reduction gear train reducing the rotation of the feed motor is engaged with the rack, thereby constituting the feed unit of the drill unit A manual handle is provided on the supporting shaft of one of gears constituting the reduction gear train, and a pair of toothed halves (17A and 17B in the said specification) are arranged on the shaft so that each half is opposed to the other in the axial direction thereof, with one half being fixed to the shaft and the other half being fixed to the frame of the boring apparatus. The pair of toothed halves from the clutch. And, by sliding the shaft in the axial direction thereof, engagement and disengagement of the halves of the toothed halves are performed, thereby performing the transmission and release of power.

In addition, in the U.S. Pat. No. mentioned above, a worm is attached to the feed motor to provide power transmission to the worm wheel disposed on the end portion of the shaft of the manual handle. Accordingly, the feed motor is attached so that its rotating shaft is perpendicular to the shaft (rotating shaft) of the manual handle which is supported horizontally, or to the rise and fall direction of the drill unit.

The above described prior art had the following problems.

(1) Since the halves of the pair of toothed halves constituting a clutch are arranged so that they are orienting to the axial direction of the manual handle and, it is needed to slide the manual handle in the axial direction thereof for the engagement-/disengagement of the toothed halves, the frame of the boring apparatus becomes large-sized in the axial direction of the manual handle.

(2) Since the rotation of the feed motor is transmitted by using a worm and a worm wheel, it is required to install the feed motor so that the rorating shaft of the feed motor matches the rise and fall direction of the drill unit, so it is difficult to place the feed motor in the casing of the boring apparatus. Since the feed motor is separately provided outside the casing, the construction of the means for installing the feed motor is complicated and the boring apparatus becomes large-sized.

SUMMARY OF THE INVENTION

It is an object of the present invention to provide a boring apparatus wherein the size in the axial direction of the shaft of the manual handle horizontally supported can be made small-sized.

The present invention is characterized in that a clutch is composed of spherical bodies, a cylindrical body having formed therein hole portions for receiving the spherical bodies, spherical body pressing means for pressing the spherical bodies to the outside or inside of the cylindrical body, and an engagement member having recessed portions engaging with the spherical bodies which are projected to the outside or inside of the cylindrical body, and the boring apparatus is constructed by using the clutch. When the spherical bodies are pressed to the outside or inside of the cylindrical body using the spherical body pressing means, the spherical bodies engagcs with the recessed portions of the engagement member, thereby letting in the clutch.

Also, the present invention is characterized in that, a reduction gear assembly is employed as the reduction gear mechanism transmitting the power of the feed motor to the rising and falling mechanism of the electric drill, which reduction gear train comprises an elliptical body being fixed to the input shaft and having a plurality of bearings disposed on the outer periphery thereof, an elastic annular body being fixed to the output shaft, having a plurality of teeth on the outer peripheral surface thereof and being placed closely on the outer periphery of the plurality of bearings, and a ring member surrounding the elastic annular body, having in the inner periphery thereof teeth more than the plurality of teeth so that they engage with part of the plurality of teeth formed on the elastic annular body.

Further, the present invention is characterized in that the reduction gear mechanism consists only of the reduction gear assembly and spur gears, and the output shaft of the feed motor is placed not in perpendicular but in parallel with the shaft of the manual handle.

Moreover, the present invention is characterized in that the spherical body pressing means is connected to the shaft of the manual handle or to the inner shaft which is disposed so as to pass through the inside of the power supply portion or axis which supplies power to the shaft of the manual handle. With this, the axial movement of the inner shaft can move the spherical body pressing means.

In addition, the present invention is also characterized in that the spherical body pressing means is connected to the inner shaft which is disposed so as to pass through the shaft of the manual handle, and the spherical body pressing means is slided by swinging the grip of the manual handle.

Furthermore, the present invention is also characterized in that the connection of the spherical body pressing means with the inner shaft is performed by using spring means so that the spherical body pressing means is movably supported in the axial direction of the inner shaft. With this, the spring means supporting the spherical body pressing means is biased if the spherical bodies are positioned between the recessed portions of the engagement member when the ball clutch is let in by sliding the inner shaft, so the spherical body pressing means does not move in spite of the sliding of the inner shaft.

Still further, the present invention is also characterized in that two annular grooves are formed in the outer periphery of the inner shaft, and a pressing member biased against the inner shaft is caused to fall into one of the annular grooves to engage therewith.

The present invention is further characterized in that a single annular groove is formed in the outer periphery of the inner shaft, and the single annular groove receives one of two pressing members which are placed adjacent each other and in the direction of the inner shaft, and biased against the inner shaft. Also by this engagement system, the let-in/out operations of the ball clutch are performed reliably.

DETAILED DESCRIPTION OF THE PREFERRED EMBODIMENTS

Figure 2:
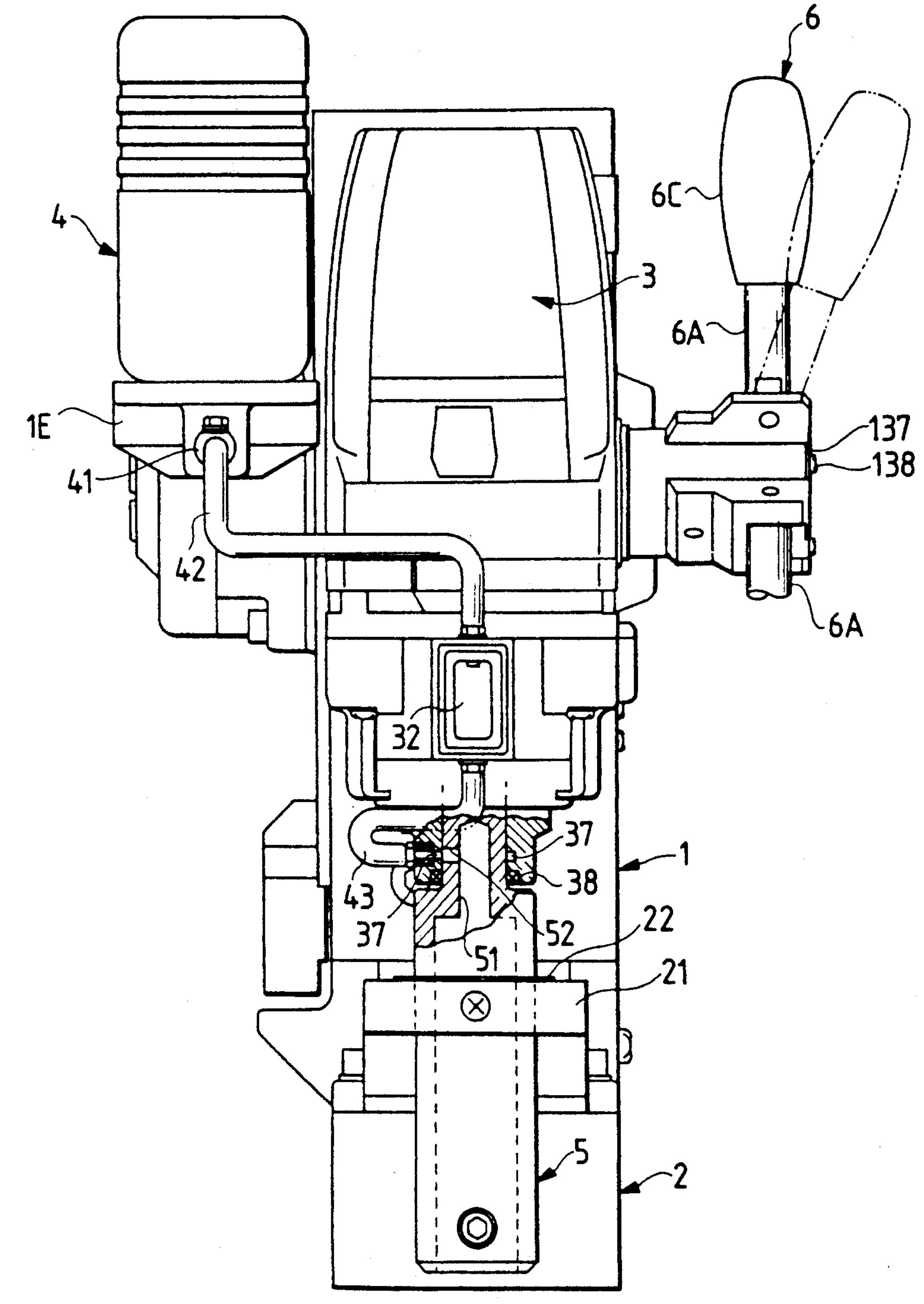
FIG. 2 is a front view showing an example of the magnetic base drill unit to which the present invention is applied, with the annular cutter being omitted.
Figure 3:
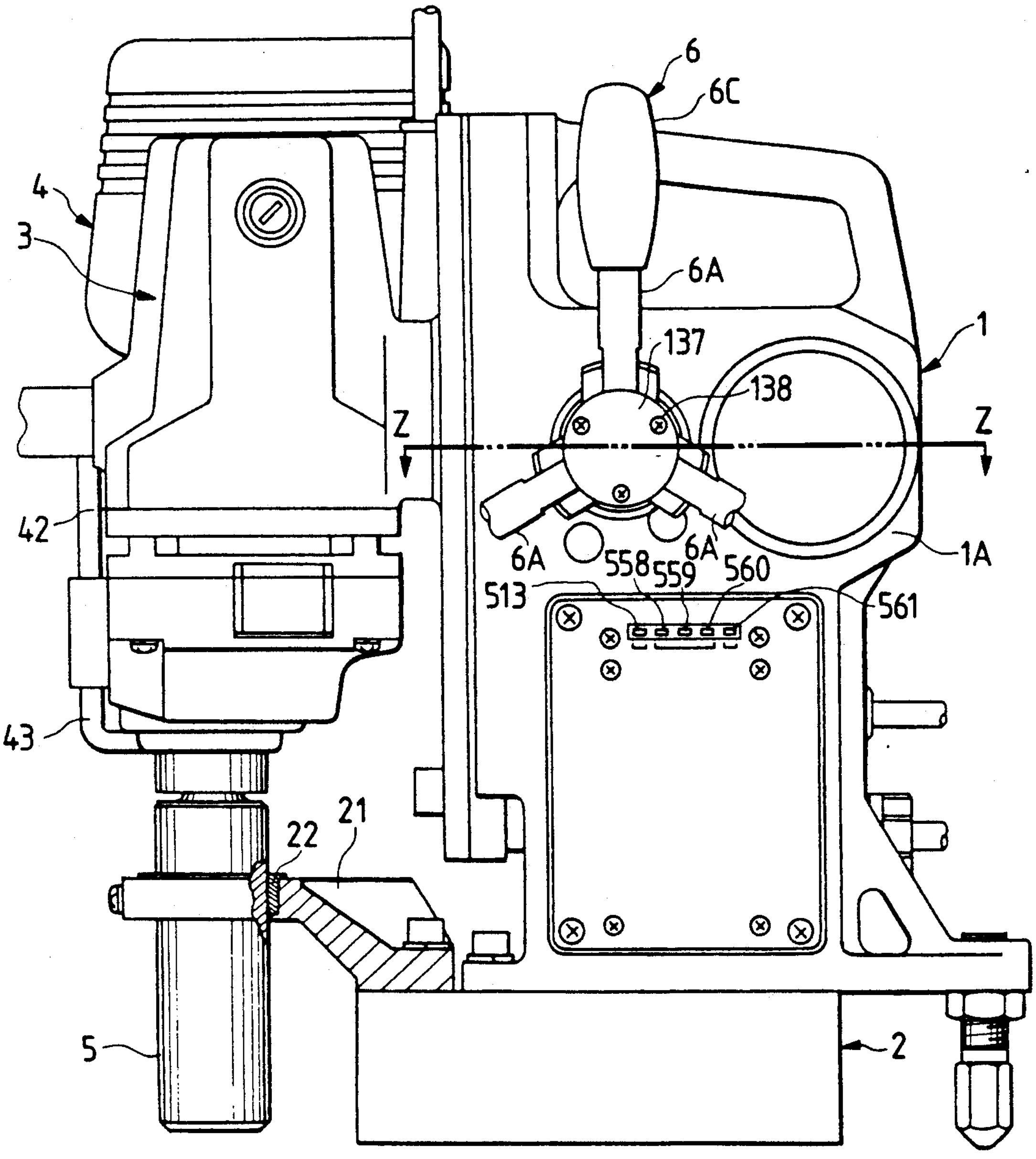
FIG. 3 is a right side view of FIG. 2.
Figure 4:
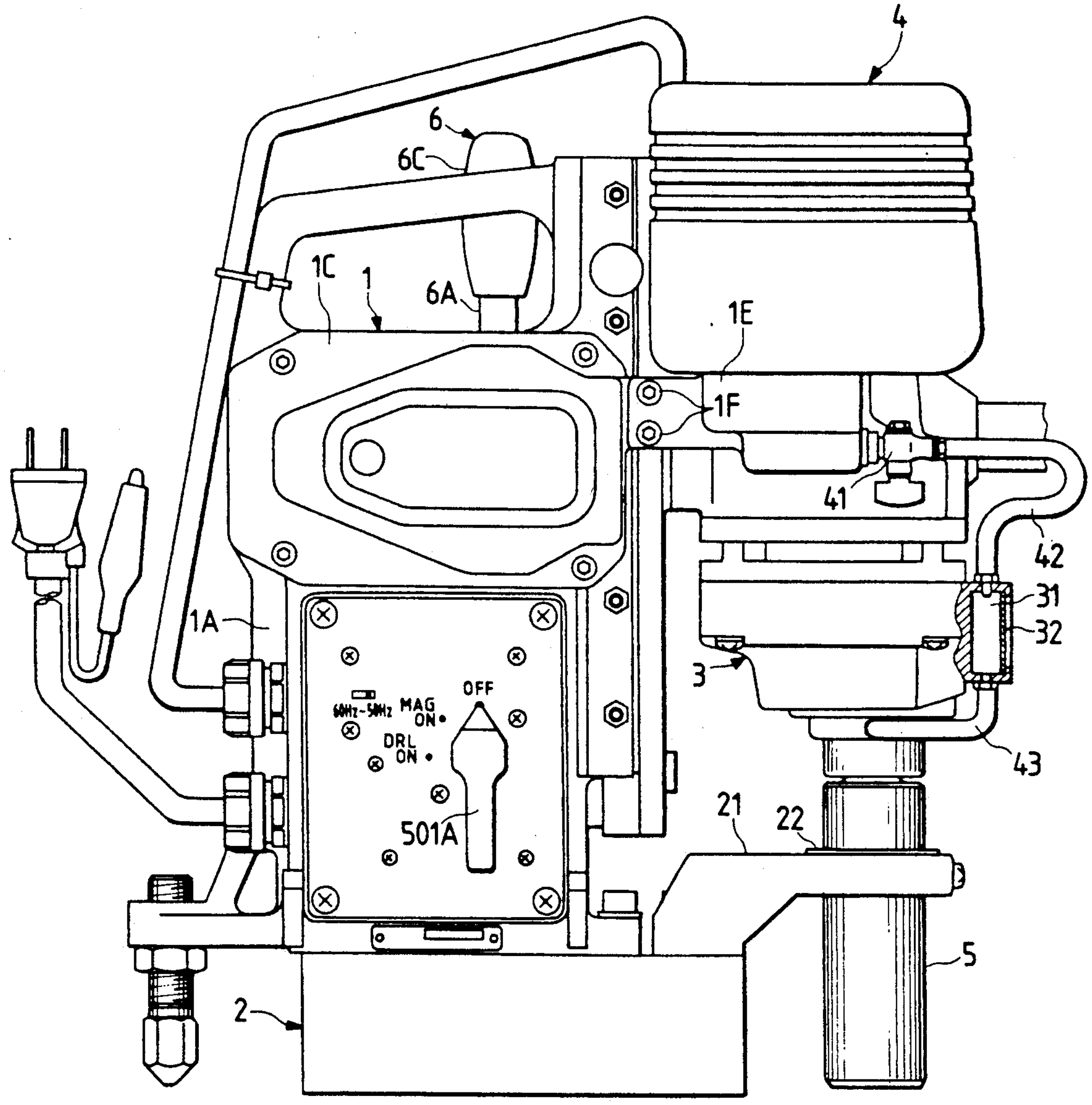
FIG. 4 is a left side view of FIG. 2.

Now, the present invention is described in detail with reference to the drawings. FIG. 2 is a front view of an example of the magnetic base drill unit to which the present invention is applied, FIG. 3 is a right side view of FIG. 2, and FIG. 4 is a left side view of FIG. 2.

In each figure, a magnetic base 2 and a drill unit 3 are attached to a frame 1. The drill unit 3 is moved upwardly and downwardly by the rotation of a feed motor 101, which is described later with reference to FIG. 1. An arbor assembly 5 of the drill unit 3 is molded integrally with the rotating shaft (spindle) of the drill unit 3, supported for rotation by the bush 22 of an arm 21 attached to the magnetic base 2, and has an annular cutter or twist drill (not shown) in its lower end portion.

A bracket 1E is attached to the frame 1 by screw 1F. A cartridge-type oil tank 4 is fixed to the bracket 1E. The cutting lubricant injected into the oil tank 4 is introduced drop by drop through an oil cock 41 and a tube 42 into oil reservoir 31 formed in the body of the drill unit 3. The oil is further introduced through a tube 43 into an annular groove 37 formed in the case of drill unit 3 supporting the arbor assembly 5.

The oil introduced into the annular groove 37 flows out through an oil introducing port 52 bored in an inner wall 5 of the arbor assembly 5 into the inner wall 5;, whereby oil supply is made to the annular cutter fixed to the arbor assembly 5. A transparent window 32 forms one wall surface of oil reservoir 31 and which wall is made of glass, resin or the like for monitoring the dropping condition of the oil introduced into the oil reservoir 31, and 38 is an oil seal.

The drill unit 3 is constructed so that is caused to rise and fall by rotation of a rotary handle 6 after a clutch (ball clutch 120) is connected. The clutch 120 will be described later with reference to FIGS. 5, and 6. 6A is a shaft, and 6C is a grip.

Figure 1:
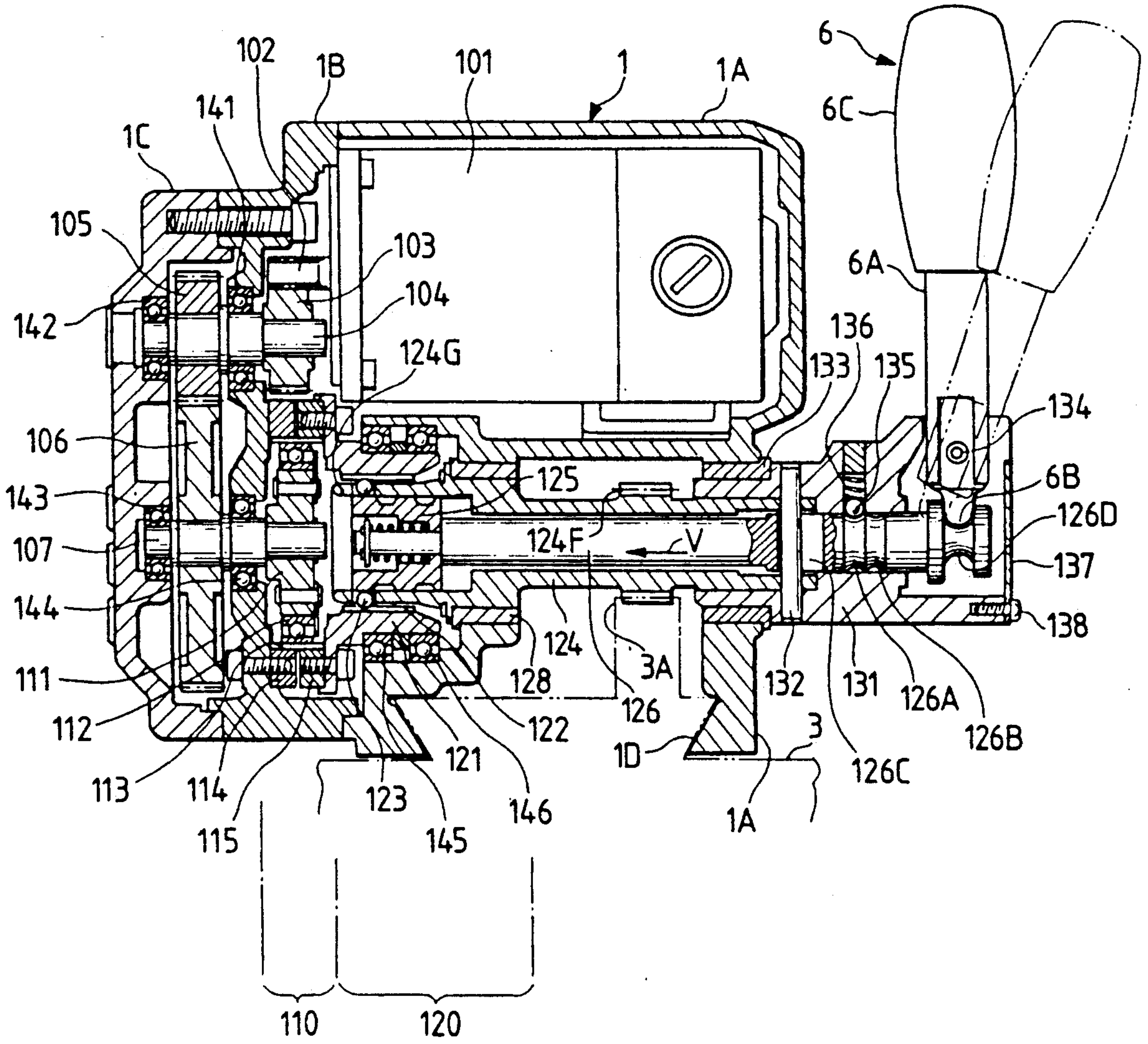
FIG. 1 is a cross-sectional view along Z-Z line of FIG. 3 and shows a Harmonic Drive unit.
Figure 6:
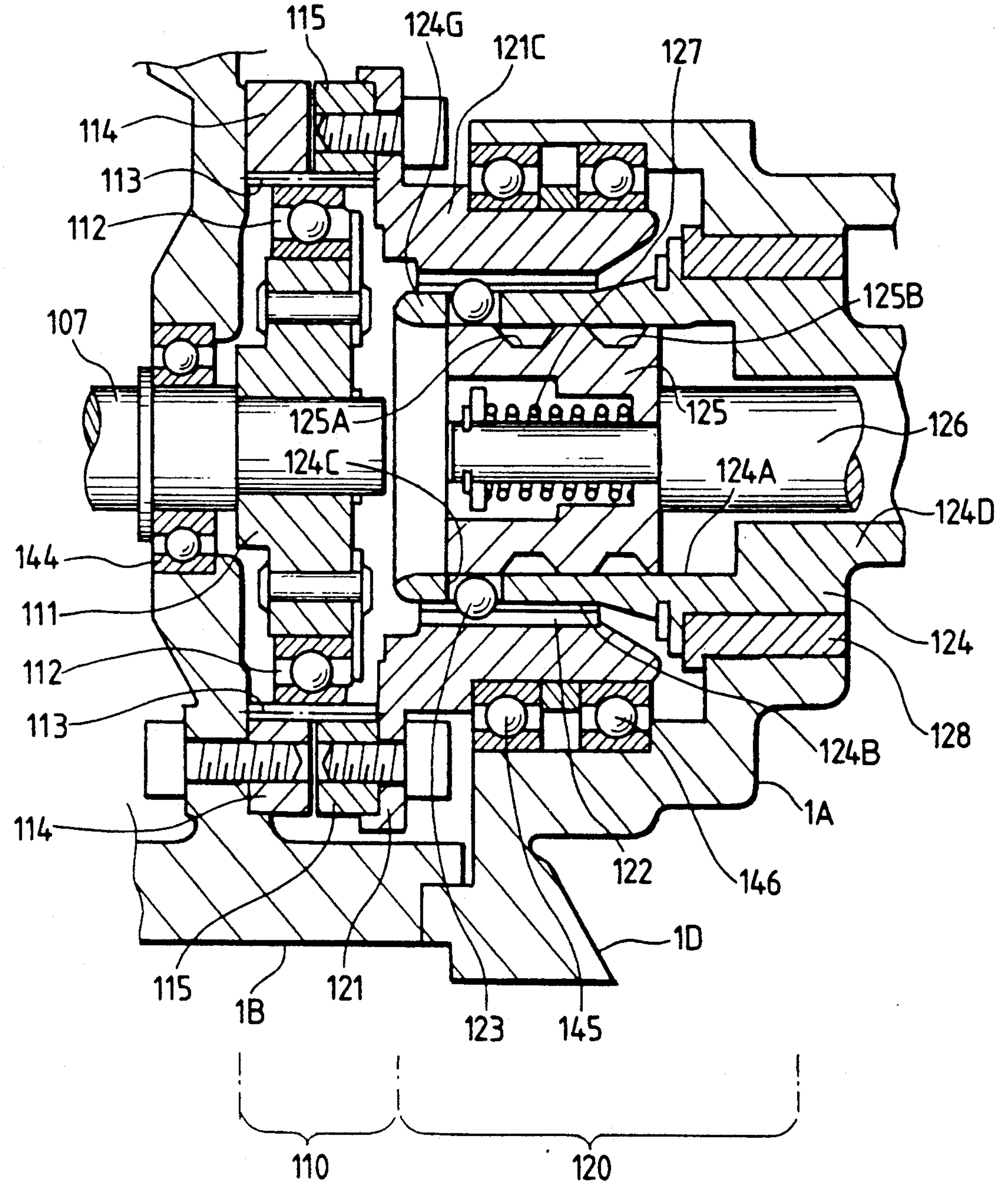
FIG. 6 is an enlarged cross-sectional view of the Harmonic Drive unit and ball clutch of FIG. 1, in which the ball clutch is connected.

FIG. 1 is a cross-sectional view along the Z—Z line of FIG. 3, and FIG. 6 is an enlarged view of "Harmonic Drive" (a registered trademark) 110 and the ball clutch 120 shown in FIG. 1. In each figure, the same symbols as FIGS. 2–4 represent the same or identical portions.

In FIGS. 1 and 6, the rotation of the main shaft of the feed motor 101 fixed to a base 1B of the frame 1 is transmitted via a pinion gear 102 fixed to the output shaft thereof, a spur gear 103, a spur gear 105 fixed to the same shaft 104 as for the spur gear 103, and a spur gear 106 to a shaft 107 fixed to the spur gear 106. A reference numerals 141 and 142 are ball bearings supporting the shaft 104, and 143 and 144 are ball bearings supporting the shaft 107.

110 is the Harmonic Drive as mentioned above, which is a reduction gear made by Harmonic Drive Systems Co., Ltd. The Harmonic Drive 110 comprises a wave generator 111, a wave generator bearings 112, a flexspline 113, a circular spline-S 114 and a circular spline-D 115.

The wave generator 111 is an ellipsoidal plate-like body (an ellipsoid) which is connected to the shaft 107 and has a plurality of wave generator bearings 112 disposed on the outer periphery thereof. The flexspline 113 has a plurality of teeth on the outer periphery thereof and is elastically deformed so that they are closely contacted with the individual wave generator bearings 112. Since the flexspline 113 is in engagement with the circular spline-S 114 and the circular spline-D 115 as described later, the shape of flexspline 113 varies as the ellipsoidal wave generator 111 rotates.

The circular splines-S 114 and -D 115 are ring-shaped members each inner peripheral portion of which is formed into a circle, and each of which has a plurality of teeth engaging with the teeth of the flexspline 113. The number of the teeth formed in the circular spline-S 114 is larger than that in the flexspline 113, and the number of the teeth formed in the circular spline-D 115 is the same as that of flexspline 113. In addition, the circular spline-S 114 is fixed to the base 1B.

Accordingly, the number of teeth of circular spline-S 114 is larger than that of flexspline 113 by two teeth, for instance, flexspline 113 rotates for two teeth relative to circular spline-S 114 as wave generator 111 rotates one revolution. Also, since the number of teeth of the circular spline-D 115 is same as that of flexspline/113, the circular spline-D 115 rotates at the same speed as flexspline 113. That is, the rotation of the shaft 107 is transmitted to circular spline-D 115 with a very high reduction ratio.

Figure 7:
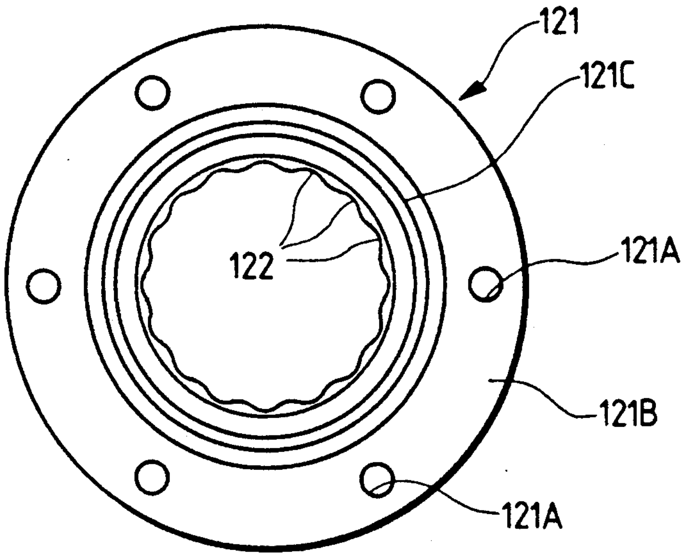
FIG. 7 is a front view of the engagement member 12 of the ball clutch.
Figure 8:
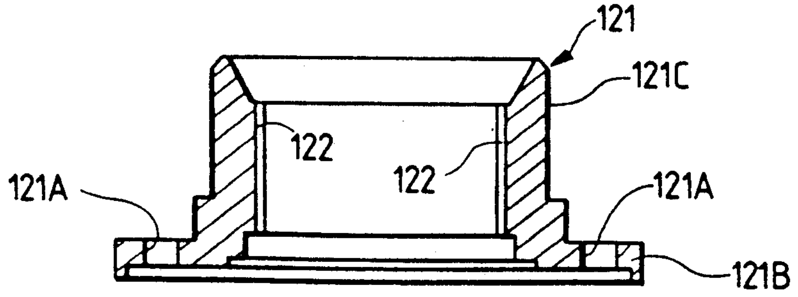
FIG. 8 is a longitudinal sectional view of the engagement member 121 of the ball clutch.

An engagement member 121 of the ball clutch 120 is connected to the circular spline-D 115. The front and longitudinal sectional views of the engagement member 121 are shown in FIGS. 7 and 8.

The engagement member 121 consists of a cylindrical portion 121C and a flange 121B. In the inner wall of the cylindrical portion 121C, a plurality of recessed portions 122 are formed as shown. 121A represent mounting holes for mounting the engagement member 121 on the circular spline-D 115.

The outer wall of the cylindrical portion 121C of the engagement member 121 is supported for rotation by ball bearings 145 and 146 in the main frame body 1A to which the base 1B is fixed. Into the cylindrical portion 121C of the engagement member 121, one end (cylindrical body 124G) of a cylindrical clutch shaft 124 supported for rotation by bush 128 relative to the main frame body 1A is inserted.

Figure 9:
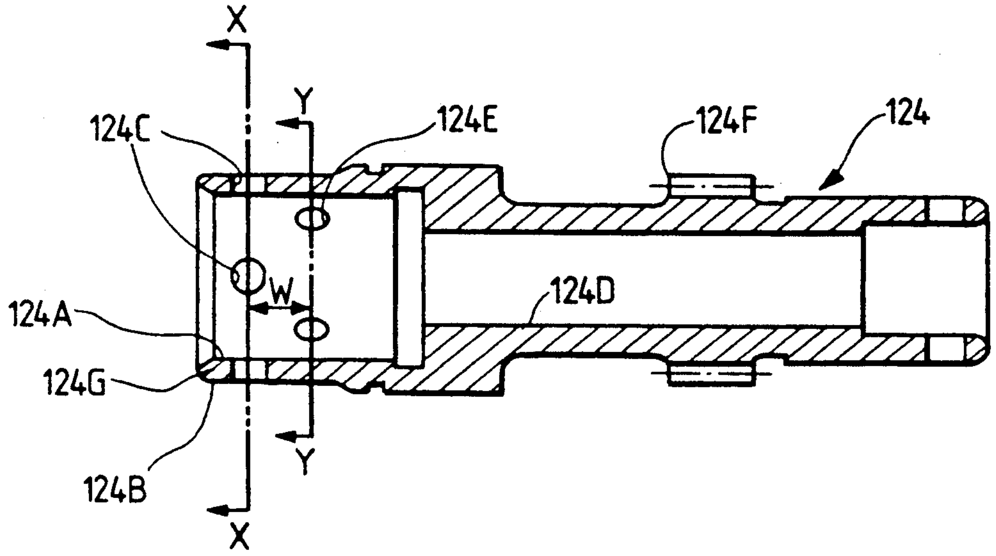
FIG. 9 is a longitudinal sectional view of the clutch shaft 124.
Figure 10:
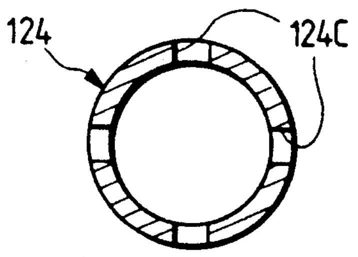
FIG. 10 is a cross-sectional view along X—X line of FIG. 9.
Figure 11:
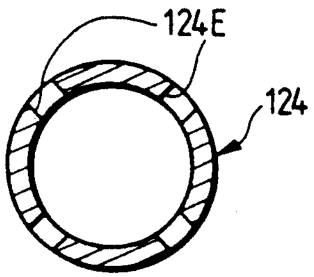
FIG. 11 is a cross-sectional view along Y—Y line of FIG. 9.

FIG. 9 is a longitudinal sectional view of clutch shaft 124, FIG. 10 is an X—X cross-sectional view of FIG. 9, and FIG. 11 is a Y—Y cross-sectional view of FIG. 9. In each figure, in the one end 124G of the clutch shaft 124, four of first hole portions 124C are formed around the clutch shaft 124 at equal intervals (at every 90° in regard to the center axis of the clutch shaft 124) so that they are passing between an inner bore 124A of a relatively large diameter and its outer surface 124B, and four of second hole portions 124E are formed at equal intervals with a distance W from the first hole portions 124C. The first and second hole portions 124C and 124E form an angle of 45° relative to the center axis of the clutch shaft 124. In FIGS. 1 and 6, the second hole portions 124E are not shown since they are hidden by clutch ring 125 which will be described later.

An inner bore 124D having a diameter smaller than the inner bore 124A is formed in the center portion of the clutch shaft 124.

Returning to FIGS. 1 and 6, an inner shaft 126 having a clutch ring 125 attached to the front end thereof is inserted into the clutch shaft 124 so that the clutch ring 125 is placed within the inner bore 124A of the clutch shaft 124. Around the clutch ring 125, first and second annular grooves 125A and 125B are provided. The distance between the first annular groove 125A and the second annular groove 125B is the same as the distance W between the first hole portions 124C and the second hole portions 124E (FIG. 9). Balls 123 are placed in each of the first and the second hole portions 124C and 124E.

Figure 5:
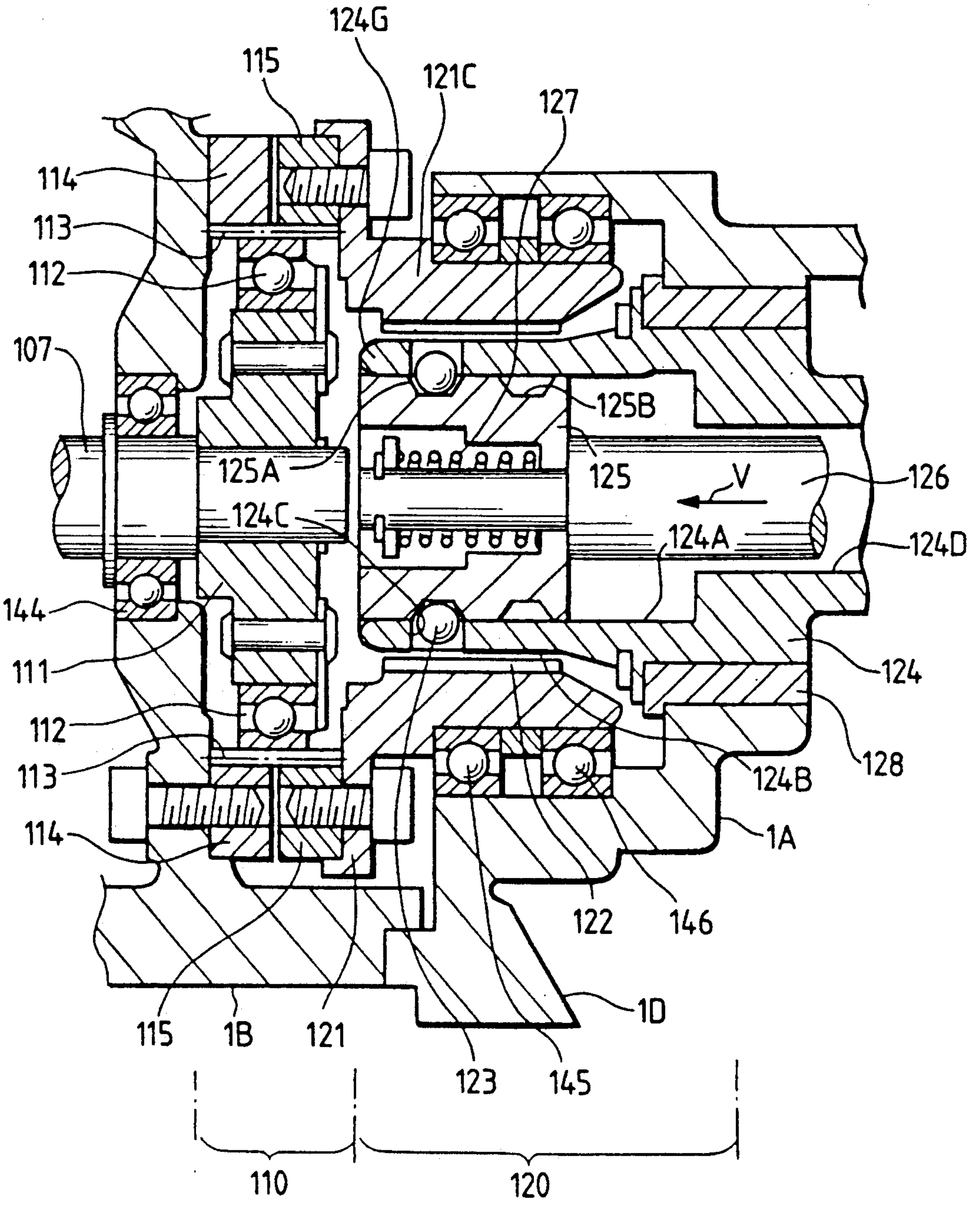
FIG. 5 is an enlarged cross-sectional view of the Harmonic Drive unit and ball clutch of FIG. 1, in which the ball clutch is disconnected.

If the first and the second hole portions 124C and 124E are opposite to the first and second annular grooves 125A and 125B of clutch ring 125, respectively, as shown in FIG. 5, the balls 123 fall in the first and second annular grooves 125A and 125B (hereinafter this condition is referred to as clutch-off). But, if the first and second annular grooves 125A and 125B of the clutch ring 125 are not opposite to the first and the second hole portions 124C and 124E, that is, if the first and the second hole portions 124C and 124E are opposite to the portion of clutch ring 125 having a diameter larger than the first and the second 11s annular grooves 125A and 125B as shown in FIG. 6, the balls 123 are pressed by the larger diameter portion and projects from the outer surface 124B of the clutch shaft 124 to be engaged with recessed portions 122 formed in the cylindrical portion 121C of engagement member 121 (hereinafter this condition is referred to as clutch-on). This allows the rotation of the engagement member 121 to be transmitted to the clutch shaft 124.

Here, in the case that inner shaft 126 is moved (in the direction opposite to that of arrow V of FIG. 5) so that the clutch condition changes from FIG. 5 to FIG. 6, if the balls 123 do not successfully go into the recessed portions 122, a spring 127 is compressed and only the clutch ring 125 maintains in the state of FIG. 5. Thereafter, if the clutch shaft 124 is rotated a little, for instance, by the operation of the rotary handle 6, the balls 123 go in the recessed portions 122, and the clutch ring 125 is put in the clutch-on condition shown in FIG. 6 by the repulsive force of the spring 127.

In the present embodiment, if it is assumed that the feed operation of the drill unit 3 in the made of hole cutting is performed by the forward rotation of the feed motor 101 as described later with reference to FIG. 1, the return operation of the drill unit 3 after the termination of the hole cutting is performed by the reverse rotation of the feed motor 101, and as a result, the power transmission shaft to which the ball clutch 120 is connected (in this example, circular spline-D 115) is also reversely rotated.

In such case, for instance, in the clutch described in the above mentioned U.S. Pat. No. 4,789,274, since the claws of a pair of claw members constituting the clutch are formed in a saw-toothed cross section, the transmission of rotation only in one direction is performed well, but the rotation in the opposite direction is not desirable since an unnatural force may be applied on the clutch. In contrast to this, the use of the above described ball clutch 120 allows the power transmission in both the forward and reverse rotations to always be performed well.

The other end of the clutch shaft 124 is connected to a handle holder member 131 by a pin 132. A long hole 126C is provided in the inner shaft 126 inserted into the clutch shaft 124 so that the axial movement thereof is not prevented by the pin 132. The clutch shaft 124 and the handle holder member 131 connected by the pin 132 constitutes the shaft (rotating shaft) of rotary handle 6. The handle holder member 131 is supported by bush 133 for rotation with respect to the main frame body 1A.

In the inner shaft 126, a first and a second annular grooves 126A and 126B are formed. A ball 135 is located in the handle holder member 131. The ball 135 is biased to the inner shaft 126 side by a spring 136 to be engaged with one of the first and second annular grooves 126A and 126B.

Specifically, the positions where the first and the second annular grooves 126A and 126B are formed and the position where the ball 135 is placed are predetermined so that the ball 135 engages with the first annular groove 126A if the clutch is connected as shown in FIGS. 1 and 6, while the ball 135 engages with the second annular groove 126B if the inner shaft 126 is moved in the direction of arrow V in FIG. 1 and clutch is disconnected as shown in FIG. 5.

The shaft 6A having grip 6C is provided in the handle holder member 131 so that it freely pivots around the pin 134. As shown in FIG. 3, three shafts 6A are provided in this example.

A projection 6B is formed in the front end of each shaft 6A. The projection 6B is engaged with an annular groove 126D formed in the side of the inner shaft 126 opposite to the side to which the clutch ring 125 is attached. By this engagement, if the shaft 6A is pivoted around the pin 134 so that the grip 6C changes from the state shown by a solid line in FIG. 1 to the state shown by an imaginary line, the inner shaft 126 moves in the direction of the arrow V, the engagement of the ball 135 moves from the first annular groove 126A to the second annular groove 126B, and the clutch is disconnected. Then, if the shaft 6A is returned from the above described state to that of the solid line, the clutch is again connected.

By the selective engagement of the ball 135 with the first annular groove 126A or the second annular groove 126B, the connection/disconnection operation of the clutch is held positively.

In FIG. 1 and 9, 137 is a blind board, 138 is a screw for fixing the blind board 137, and 124F is a pinion formed on the clutch shaft 124. The pinion 124F is in engagement with a rack 3A of the drill unit 3 which is slidably attached to a dovetail groove 1D formed in the main frame body 1A. Therefore, if the ball clutch 120 is disconnected and the rotary handle 6 is rotated, the drill unit 3 rises and falls by according to the rotation of the handle 6, and if the ball clutch 120 is connected and the feed motor 101 is energized, the drill unit 3 automatically rises and falls. 1C represents a cover of the frame 1.

Although, in FIG. 1, it is shown that a pin 132 coupling the clutch shaft 124 and the handle holder member 131 is mounted so as to pass through the shaft 124, the handle holder member 131 and the inner shaft 126, the pin 132 may be formed shorter in length and mounted so that it does not pass through the inner shaft 126. In this case, it is not required to form the long hole 126C in the inner shaft 126.

Although it has been described that the clutch shaft 124 and the handle holder member 131 are separate parts and they are coupled by the pin 132, the shaft 124 and the handle holder member 131 may be integrally formed.

Although the first and second hole portions 124C and 124E are formed in the clutch shaft 124 in the axial direction thereof in FIG. 9, but either the first hole portions 124C or the second hole portions 124E may be omitted. By this omission, either the first annular groove 125A or the second annular groove 125B can be omitted, thereby enabling the magnetic base drill unit to be smaller.

Ball clutch 120 basically comprises four parts; spherical bodies (balls 123); a cylindrical body 124G (the end portion of the clutch shaft 124 which is positioned in the vicinity of the Harmonic Drive unit 110) in which the hole portions (first hole portions 124C and/or second hole portions 124E) for receiving the spherical bodies; spherical body pressing means for pressing the spherical body externally or internally of the cylindrical body 124G (in this embodiment, the clutch ring 125 for pressing the ball 123 externally of the cylindrical body 124G); and an engagement member having the recessed portions 122 which engage with the spherical bodies projected externally or internally of the cylindrical body 124G (in this embodiment, the engagement member 121 having in its inner bore the recessed portions 122 which engage with the balls 123 projected externally of the cylindrical body 124G).

In such ball clutch, since the cylindrical body 124G only needs to be disposed between the spherical body pressing means and the engagement member, the engagement member may either be placed outside the cylindrical body 124G as in this embodiment or inside the cylindrical body 124G.

Of course, when the engagement member is placed inside the cylindrical body 124G, recessed portions 122 engaging with the balls 123 are formed in the outer surface of the engagement member, and the first annular groove 125A (and/or the second annular groove 125B) is formed in the bore of the clutch ring 125.

The driving source power and the driven member to be connected to the ball clutch 120 only need to be connected to each of the engagement member and cylindrical body 124G, respectively. That is, although, in the previous description, the engagement member 121 of the ball clutch 120 is connected to the circular spline-D 115 of the Harmonic Drive unit 110, and the cylindrical body 124G having therein formed the first and the second hole portions 124C and 124E for receiving the balls 123 is formed in the clutch shaft 124, it may be possible that the cylindrical portion 121C of the engagement member 121 having the recessed portions 122 formed therein may be formed in the clutch shaft 124, and that the cylindrical body having the first and the second hole portions 124C and 124E formed therein may be connected to the circular spline-D 115. It is also similar if the engagement member is disposed within the cylindrical body 124G.

Although it has been described that the inner shaft 126 having the clutch ring 125 connected thereto passes through the inside of the clutch shaft 124 and the handle holder member 131 and, the inner shaft 126 is slided by the operation of the grip 6C to connect/disconnect the ball clutch 120, it is possible that the grip 6C is fixed in regard to the handle holder member 131, and the inner shaft 126 is manually operated to control the ball clutch 120. It may be also possible that, for instance, by making the shaft 107 of a hollow structure, allowing the inner shaft 126 to pass through the shaft 107, and by sliding the inner shaft 126 in the shaft 107, the ball clutch 120 may be controlled.

Although, in the previous description, two annular grooves (the first and the second annular grooves 126A and 126B) are formed in the inner shaft 126 as shown in FIG. 5 and the ball 135 biased by the spring 136 is engaged with one of the two annular grooves by the connection/ disconnection operation of the ball clutch 120, it is not restricted only to this, and it may be allowed that only one annular groove is formed in the inner shaft 126 and two balls are placed apart from each other in the axial direction and biased.

As apparent from the above description, the following advantages are achieved.

(1) Since the engagement of the spherical bodies with the engagement member is performed in the direction perpendicular to the moving direction of the spherical body pressing means, or the direction perpendicular to the axial direction of the manual handle, the clutch, hence the boring apparatus can be made small-sized at least in the axial direction of the manual handle.

(2) The use of a harmonic drive unit as the reduction gear mechanism allows each component thereof to be disposed coaxially with respect to the input shaft thereof, so the reduction means, hence the boring apparatus can further be made small-sized.

(3) Since the reduction gear mechanism is constituted only by a harmonic drive unit and spur gears, the reduction means, hence the boring apparatus can further be made small-sized. Since the feed motor can be disposed so that its output shaft is in parallel with the shaft of the manual handle, the feed motor is easy to be accommodated in the casing of the boring apparatus, and means for attaching the motor to the casing is simplified.

(4) Since the spherical body pressing means can be moved by operating the inner shaft in the axial direction thereof, the fall clutch of the boring apparatus can easily be operated.

(5) Since the manual handle may also serve as the operating means for the ball clutch, the boring apparatus is made smaller-sized and the operation of the ball clutch is made easy. Particularly, since the operation of the ball clutch is often performed after the drill unit has been lowered by using the manual handle and the positioning of the drill to a workpiece has been performed, the operation performance of the boring apparatus are particularly improved.

(6) Since the spring means supporting the spherical body pressing means is biased if the engagement of &he spherical bodies with the recessed portion formed in the engagement member is not successful in the operation letting in the clutch, the spherical body pressing means does not move regardless of the sliding of the inner shaft in the axial direction thereof. Therefore, no excessive force is applied on the ball clutch, so the lifetime of the ball clutch is prolonged. In this case, if one of the cylindrical body in which the spherical bodies are disposed, and the engagement member constituting the ball clutch in cooperation with the cylindrical body is rotated a little, the spherical bodies are made engaged with the recessed portion formed in the engagement member thereby the clutch is connected.

(7) Since the let-in/out operations of the ball clutch are maintained reliably, the erroneous operation of the clutch is prevented.

What is claimed is:

1. A boring apparatus including a frame having a magnetic base to be magnetically adhered to a workpiece, an electric drill having a drill motor, a feed motor fixed to the frame, a reduction gear mechanism connected to the output of the feedmotor, a driving shaft for rising/falling of the electric drill connected to the output means of the reduction gear mechanism through a clutch means, and a manual handle for rising-/falling of the electric drill being provided on the driving shaft, the clutch means comprising:

- a cylindrical body having a plurality of through-hole portions formed in the circumferential direction thereof and being provided in one of the output means of the reduction gear mechanism and one end of the driving shaft,
- spherical bodies placed in the plurality of the through-hole portions in the cylindrical body,
- an engagement member having a plurality of elongate concave portions formed in the direction of the axis of the driving shaft so as to oppose to and to engage with the spherical bodies, and being provided on the other of the output means of the reduction gear mechanism and the one end of the driving shaft, and
- a spherical body pressing means being slidable to a first and a second positions in the axial direction of the driving shaft and having an annular groove which is faced to the through-hole portions to receive the spherical bodies therein at the first position thereby the clutch is disconnected and is not faced to the through-hole portions to press the spherical bodies against the elongate concave portions at the second position thereby the clutch is connected.

2. The boring apparatus as set forth in claim 1 wherein the reduction gear mechanism includes a reduction gear assembly, said reducion gear assembly comprising:

- an elliptical body fixed to an input driving shaft of the reduction gear assembly and having a plurality of bearings disposed on the outer periphery thereof,
- an elastic annular body angularly fixed to the output means of the reduction gear assembly, having a plurality of teeth on the outer peripheral surface thereof, and closely disposed on the outer periphery of the plurality of bearings, and
- a ring-shaped member fixed to the frame, and having teeth formed in the inner periphery thereof the number of which teeth is greater than that of the teeth formed in the elastic body so that the teeth formed in the ring-shaped member engage with a part of the teeth formed in the elastic annular body.

3. The boring apparatus as set forth in claim 2 wherein the output shaft of the feed motor is supported in parallel with the driving shaft of the rising/falling of the electric drill and the input driving shaft of the reduction gear assembly, and the output shaft of the feed motor and the input driving shaft of the reduction gear assembly are mechanically connected each other through spur gears respectively fixed to the output shaft of the feed motor and the input driving shaft of the reduction gear assembly.

4. A boring apparatus including a frame having a magnetic base to be magnetically adhered to a workpiece, an electric drill having a drill motor, a feed motor fixed to the frame, a reduction gear mechanism connected to the output of the feedmotor, a driving shaft for rising/falling of the electric drill connected to the output means of the reduction gear mechanism through a clutch means, and a manual handle for rising/falling of the electric drill being provided on the driving shaft, the clutch means comprising:

- a cylindrical body having a plurality of through-hole portions formed in the circumferential direction thereof and being provided on one end of the driving shaft,
- spherical bodies placed in the plurality of the through-hole portions in the cylindrical body,
- an engagement member having a plurality of elongate concave portions formed in the direction of the axis of the driving shaft so as to oppose to and to engage with the spherical bodies, and being provided on the output means of the reduction gear mechanism, and
- a spherical body pressing means being slidable to a first and a second positions in the axial direction of the driving shaft and having an annular groove which is faced to the through-hole portions to receive the spherical bodies therein at the first position thereby the clutch is disconnected and is not faced to the through-hole portions to press the spherical bodies against the elongate concave portions at the second position thereby the clutch is connected, which spherical body pressing means is connected to an inner shaft coaxially passing through the inside of the driving shaft of the rising-/falling of the electric drill.

5. The boring apparatus as set forth in claim 4 wherein an annular groove is formed in the opposite end portion of the inner shaft on which the spherical body pressing means is connected, and the grip of the manual handle is attached to the inner shaft so that it is swingable in the axial direction of the inner shaft and the end portion of the grip engages with the annular groove of the inner shaft.

6. The boring apparatus as set forth in claim 4 wherein the spherical body pressing means is mounted to the inner shaft by spring means which bias the spherical body pressing means against the inner shaft in the axial direction thereof.

7. The boring apparatus as set forth in claim 4 wherein two adjacent annular grooves are formed in the outer periphery of the inner shaft, and one of the annular grooves is engaged with an engagement member biased toward the inner shaft.

8. A boring apparatus including a frame having a magnetic base magnetically adhered to a workpiece, an electric drill having a drill motor, a feed motor fixed to the frame, a reduction gear mechanism connected to the output of the feedmotor, a driving shaft for rising/falling of the electric drill connected to the output means of the reduction gear mechanism through a clutch means, and a manual handle for rising/falling of the electric drill being provided on the driving shaft, the clutch means comprising:

a cylindrical body having a plurality of through-hole portions formed in the circumferential direction thereof and being provided on the one end of the driving shaft, spherical bodies placed in the plurality of the through-hole portions in the cylindrical body, an engagement member having a plurality of elongate concave portions formed in the direction of the axis of the driving shaft so as to oppose to and to engage with the spherical bodies, and being provided on the output means of the reduction gear mechanism, and a spherical body pressing means being slidable to a first and a second positions in the axial direction of the driving shaft and having an annular groove which is faced to the through-hole portions to receive the spherical bodies therein at the first position thereby the clutch is disconnected and is not faced to the through-hole portions to press the spherical bodies against the elongate concave portions at the second position thereby the clutch is connected, which spherical body pressing means is connected to an inner shaft coaxially passing through the inside of the driving shaft of the rising-/falling of the electric drill.

* * * * *